US006842730B1

(12) United States Patent
Ejerhed et al.

(10) Patent No.: US 6,842,730 B1
(45) Date of Patent: Jan. 11, 2005

(54) METHOD AND SYSTEM FOR INFORMATION EXTRACTION

(75) Inventors: Eva Ingegord Ejerhed, Stockholm (SE); Peter A. Braroe, Stockholm (SE)

(73) Assignee: Hapax Limited, London (GB)

(*) Notice: Subject to any disclaimer, the term of this patent is extended or adjusted under 35 U.S.C. 154(b) by 456 days.

(21) Appl. No.: 09/599,563

(22) Filed: Jun. 23, 2000

(51) Int. Cl.[7] .................. G06F 17/27; G06F 12/20; G06F 17/30
(52) U.S. Cl. .................. 704/9; 704/8; 707/3; 707/4; 707/5
(58) Field of Search .................. 707/5, 4, 3, 102; 704/9, 8, 257, 2, 1; 434/362

(56) References Cited

U.S. PATENT DOCUMENTS

| | | | |
|---|---|---|---|
| 5,309,359 A | 5/1994 | Katz | |
| 5,519,608 A | 5/1996 | Kupiec | |
| 5,696,962 A | 12/1997 | Kupiec | |
| 5,794,050 A | 8/1998 | Dahlgren et al. | |
| 5,933,822 A | 8/1999 | Braden-Harder et al. | |
| 5,963,940 A | 10/1999 | Liddy et al. | |

FOREIGN PATENT DOCUMENTS

| | | |
|---|---|---|
| EP | 0 886 226 A1 | 12/1998 |
| WO | 97/38376 | 10/1997 |

OTHER PUBLICATIONS

Voorhees, E. "Using WordNet for Text Retrieval," in WordNet an Electronic Lexical Database edited by C. Fellbaum, 1998, pp. 295–303.*

Arampatzis et al., "Linguistically–motivated Information Retrieval," Sep. 1999, Technical Report CSI–R9918, University of Nijmegen, The Netherlands, pp. 1–24.*

Dragomir et al., "Ranking suspected answers to natural language questions using predictive annotation," May 2000, ANLP 2000, Seattle, WA, pp. 1–8.*

AltaVista Search Developer's Kit 97, Dec. 1997, [This document is a compilation of the HTML files available with the installed software,] Maynard, Massachusetts, pp. 1–43 plus A1 to A7.

Cunningham, H. et al, 1997, Software infrastructure for Natural Language Processing, in Proceedings of *Fifth Conference on Applied Natural Language Processing* (Mar. 31 –Apr. 3, 1997, Washington, DC, USA), Association for Computational Linguistics, pp. 237–244.

(List continued on next page.)

*Primary Examiner*—Vijay Chawan
*Assistant Examiner*—V. Paul Harper
(74) *Attorney, Agent, or Firm*—Burns, Doane, Swecker & Mathis, LLP

(57) ABSTRACT

A method and a system for extracting information from a natural language text corpus based on a natural language query are disclosed. In the method the natural language text corpus is analyzed with respect to surface structure of word tokens and surface syntactic roles of constituents, and the analyzed natural language text corpus is then indexed and stored. Furthermore a natural language query is analyzed with respect to surface structure of word tokens and surface syntactic roles of constituents. From the analyzed natural language query one or more surface variants are then created, where these surface variants are equivalent to the natural language query with respect to lexical meaning of word tokens and surface syntactic roles of constituents. The surface variants are then compared with the indexed and stored analyzed natural language text corpus, and each portion of text comprising a string of word tokens that matches the any one of the surface variants or the natural language query is extracted from the indexed and stored analyzed natural language text corpus.

8 Claims, 3 Drawing Sheets

OTHER PUBLICATIONS

Grishman, R. & the TIPSTER Phase III Contractors, 1998, *TIPSTER Text Architecture Design*, Version 3,1 Oct. 7, 1998, New York University, pp. 1–62.

McKelvie, D., Brew, C. & Thompson, H., 1997, Using SGML as a basis for a data–intensive NLP, in Proceedings of *Fifth Conference on Applied Natural Language Processing* (Mar. 31 –Apr. 3, 1997, Washington, DC, USA), Association for Computational Linguistics, pp. 229–236.

Wilks, Y. & Gaizauskas, R., 1999, LaSIE jumps the GATE, in T. Strzalkowski (ed.), *Natural Language Information Retrieval*, Kluwer Academic Publishers, the Netherlands, pp. 197–214.

Zajac, R., Casper, M. & Sharples, N., 1997, An open distributed architecture for reuse and integration of heterogenous NLP components, in Proceedings of *Fifth Conference on Applied Natural Language Processing* (Mar. 31 –Apr. 3, 1997, Washington, DC, USA), Association for Computational Linguistics, pp. 245–252.

A. Arampatzis et al. An Evaluation of Linguistically–motivated Indexing Schemes.

R. Pohlman et al. The Effects of Sytactic Phrase Indexing on Retrieval Performance for Dutch Texas.

A. Arampatzis et al; Phrase–based Information Retrieval.

* cited by examiner

| the city | was | destroy | ed | by | the enemy |
|---|---|---|---|---|---|
| N₂ | be v | V | v | | N₁ |

METHOD AND SYSTEM FOR INFORMATION EXTRACTION

FIELD OF THE INVENTION

The present invention relates to the field of information retrieval from unrestricted text in different languages. Specifically, the present invention relates to a method, and a corresponding system, for extracting information from a natural language text corpus based on a natural language query.

BACKGROUND OF THE INVENTION

The field of automatic retrieval of information from natural language text corpus has in the past been focused on the retrieval of documents matching one or more key words given in a user query. As an example, most conventional search engines on the Internet use Boolean search for matches with the key words given by the user. Such key words are standardly considered to be indicative of topics and the task of standard information retrieval system has been seen as matching a user topic with document topics. Due to the immense size of the text corpus to be searched in information retrieval systems today, such as the entire text corpus available on the Internet, this type of search for information has become a very blunt tool for information retrieval. A search will most likely result in an unwieldy number of documents. Thus, it will take a lot of effort from the user to find the most relevant documents among the documents retrieved. Furthermore, due to the ambiguity of words and the way they are used in a text, many of the documents retrieved % ill be irrelevant. This will make it even more difficult for the user to find the most relevant documents.

The performance of an information retrieval system is usually measured in terms of its recall and its precision. In information retrieval, the technical term recall has a standard definition as the ratio of the number of relevant documents retrieved for a given query over the total number of relevant documents for that query. Thus, recall measures the exhaustiveness of the search results. Furthermore, in information retrieval, the technical term precision has a standard definition as the ratio of the number of relevant documents retrieved for a given query over the total number of documents retrieved. Thus, precision measures the quality of the search results. Due to the many documents retrieved when using the above type of search methods, it has been realised within the art that there is a need to reduce the number of retrieved documents to the most relevant ones. In other words, as the number of documents in the text corpus increases, recall becomes less important and precision becomes more important. Thus, suppliers of systems for information retrieval have enhanced Booloan search by using relevance ranking metrics based on statistical methods. However, it is well known that thus highly ranked documents still comprise irrelevant documents. This is due to the fact that the matching is too coarse and does not take the context it which the matching words occur into account. In order to find the documents that are relevant to a user query, there is a need for the information retrieval system to in some way understand the meaning of a natural language query and of the natural language text corpus from which the information is to be extracted.

There are proposals within the art of how to create an information retrieval system that can find documents in a natural language text corpus that match a natural language query with respect to the semantic meaning of the query. Some of these proposals relate to systems that have been extended with specific world knowledge within a given domain. Such systems are based on an extensive database of world knowledge within a single area. Creating and maintaining such databases of world knowledge is a well-known knowledge engineering bottleneck. Furthermore, such databases scale poorly and a database within one domain can not be ported to another domain. Thus, it would not bs feasible to extend such a system to a general application for finding information in unrestricted text, which could relate to any domain.

Other proposals are based on underlying linguistic levels of semantic representation. In these proposals, instead of using verbatim matching of one or more key words, a semantic analysis of the natural language text corpus and the natural language query is performed and documents are returned that match the semantic content meaning of the query. However, creating a deep level semantic representation of very large natural language text corpora is a complex and demanding task. This is due to a multi-level representation of the text, different analysis tools for different levels and propagation of errors from one level to another. Because representations at different levels are interdependent and for reasons given above the resulting analyses will be fragile and error prone.

SUMMARY OF THE INVENTION

An objective of the present invention is to provide an improved method, and a corresponding system, for extracting information from a natural language text corpus, that is not subject to the foregoing disadvantages of existing methods for these tasks. This object is achieved by a method and a system according to the accompanying claims.

The present invention is based on the recognition that there is a close relationship 1) between the syntactic relations between constituents in clauses and sentences in a natural language text corpus and the semantic relations between them and 2) between word tokens within constituents and the structural and semantic relations between them. More specifically, the present invention is based on the recognition that these syntactic-semantic relationships can be used when matching a natural language query with a natural language text corpus to find text portions in the natural language text corpus that have the same meaning as the natural language query.

According to one aspect of the invention a method for extracting information from a natural language text corpus based on a natural language query is provided. In the method the natural language text corpus is analyzed with respect to surface structure of word tokens and surface syntactic roles of constituents, and the analyzed natural language text corpus is then indexed and stored. Furthermore a natural language query is analyzed with respect to surface structure of word tokens and surface syntactic roles of constituents. From the analyzed natural language query one or more surface variants are then created, where these surface variants are equivalent to the natural language query with respect to 1) lexical meaning of word tokens and 2) surface syntactic roles of constituents. The surface variants are then compared with the indexed and stored analyzed natural language text corpus, and each portion of text comprising a string of word tokens that matches the one of said surface variants or said natural language query is extracted from the indexed and stored analyzed natural language text corpus.

In "surface structure of word tokens" and "surface syntactic roles of constituents" the term "surface" indicates that the word tokens and constituents are considered as they appear and in the order they appear in the text, and the term "constituents" refers to the basic parts of the text, such as word tokens, phrases etc. An important property of these features is that they can be found using a single-level analysis, e.g. using shallow parsing. For example the constituents always consist of word tokens that are contiguous in the text.

By analyzing the natural language query with respect to surface structure of word tokens and surface syntactic roles of constituents it is possible to create surface variants of the analyzed natural language query that maintain the lexical meaning of word tokens and the surface syntactic roles of constituents. These variants together with the natural language query form a set of alternative ways of expressing the same meaning as the original natural language query. The creation of variants utilizes the fact that the surface syntactic roles of the constituents together with the lexical meaning of the word tokens are closely connected to the meaning of a natural language text unit, such as a sentence, phrase or clause. The variants that have been created are then compared with an indexed and stored analyzed text corpus, where the natural language text corpus has been analyzed in the same manner as the natural language query. Since not only the natural language query, but all variants as well are compared, the number of matches is increased relative to what it would be if the matching were verbatim. However, due to the fact that the lexical meaning of word tokens and the surface syntactic roles of constituents are preserved in the variants of the natural language query, it is ensured that matches in the natural text corpus have the same moaning as the natural language query.

One advantage of the invention is that it uses a single-level analysis of the natural language text corpus and the natural language query, as opposed to known methods that use multi-level analyses, which makes the invention faster and more reliable. At the same times its precision is high and the amount of retrieved information is manageable. Furthermore, the creation of variants makes it possible to minimize the amount of work carried out during the comparison of the natural language query with the natural language text corpus. The analysis of the natural text corpus can be done in advance and be stored in an index. This limits the analysis to be done in real time to the analysis of the natural language query. Thus, the method according to the invention is significantly faster than the known methods using linguistic analysis.

In an embodiment of the invention the surface syntactic roles of constituents are head and modifier roles, and grammatical relations. By maintaining these roles when creating surface variants of the natural language query the surface variants will express the same meaning as the natural language query.

In another embodiment of the invention, a string of word tokens in said indexed and stored analyzed natural language text corpus matches one of the surface variants, or the analyzed natural language query, if it comprises the head words of phrases bearing the grammatical relations of subject, object, and the lexical main verb in said one of the surface variants or the analyzed natural language query in the same linear order as in said one of the surface variants or the analyzed natural language query. In this way the matching becomes straightforward and thus, the method becomes faster. It is to be noted that the number of variants created may be reduced when at the same time the matching is relaxed. However, there is always a trade-off between the time for the analysis that needs to be done during matching and the time for matching a number of variants.

In a preferred embodiment, the analysis of the natural language text corpus and the natural language query comprises the steps of determining a morpho-syntactic description for each word token, locating phrases, determining a phrase type for each of the phrases, and locating clauses. Furthermore, for each word token of said natural language text corpus, a unique word token location identifier is provided and information regarding the location of each word token, each phrase of each typo, and each clause in said natural language text corpus is stored, based on said unique word token location identifiers. The information regarding the location of a word token is preferably a word type associated to the word token and its unique word token location identifier logically linked to the stored associated word type. In this way each word type is only stored once instead of storing each word token of the natural language text corpus. This is especially advantageous in cases where the natural language text corpus is large. Furthermore, the information regarding the location of a phrase is preferably the phrase type of the phrase and a unique phrase location identifier logically linked to the stored phrase type, wherein the unique phrase location identifier identifies the word tokens spanned by the phrase. The information regarding the location of a clause is preferably a unique clause location identifier identifying the word tokens and phrases spanned by the clause. Similar identifiers are preferably stored for sentences, paragraphs and documents located in the natural text corpus. In this embodiment the matching is significantly simplified since a word token in a natural language query can be matched with word tokens in the natural language text corpus by finding the word type of the word token and directly extracting the stored word token identifiers associated with this sword type. Furthermore, the phrase type of the word token in the natural language query is then used to see if any of the matching word tokens in the natural language text corpus is included in a phrase of the same typo. This is easily done since the stored unique phrase location identifiers, which are associated with this phrase type, identifies the word tokens that are spanned by each phrase.

Furthermore, in yet another embodiment, the portion of text that is extracted is either the matching string of word tokens, a clause comprising the matching string of word tokens, a sentence comprising the matching string 3 of word tokens, a paragraph comprising the matching string of word tokens, or a document comprising the matching string of word tokens. This embodiment enables the extraction of other portions of text than the whole document where a matching string is found. This is a significant simplification for a user, since the amount of manual post-analysis, in the form of searching the extracted documents in order to find the information of interest, that is needed can be minimized. Taken together with the preferred embodiment above the different portions of text can easily be found due to the way the natural language text corpus has been indexed and stored.

According to a second aspect of the invention a system for extracting information from a natural language text corpus based on a natural language query is provided. The system comprises a text analysis unit for analyzing a natural language text corpus and a natural language query with respect to surface structure of word tokens and surface syntactic roles of constituents. To the analysis unit storage means for storing the analyzed natural language text corpus are operatively connected to said text analysis unit. Furthermore the system comprises an indexer, operatively connected to the storage means, for indexing the analyzed natural language text corpus, and an index, operatively connected to the indexer, for storing said indexed analyzed natural language text corpus. The system also comprises a query manager, operatively connected to the text analysis unit, comprising means for creating surface variants of the natural language query, said surface variants being equivalent to said natural language query with respect to lexical meaning of word tokens and surface syntactic roles or constituents, and means for comparing said surface variants and the analyzed natural language query with the indexed analyzed natural language text corpus in said index. Finally, the system comprises a result manager, operatively connected to the index, for extracting, from the indexed and stored analyzed natural language text corpus, each portion of text comprising a string of word tokens that matches any one of the surface variants or the analyzed natural language query. Thus, by recognizing the fact that there is more information regarding the meaning of a natural language text inherent in the surface structural and semantic relations between constituents and word tokens of the natural language text, and by using an expansion of a natural language query into surface variants that maintain the lexical meaning of word tokens and surface syntactic roles of constituents of the original natural language query, an improved method for information extraction can be achieved that is fast, reliable and that has a high precision.

BRIEF DESCRIPTION OF THE DRAWINGS

In the following, the present invention is illustrated by way of example and not limitation with reference to the accompanying drawings, in which.

DETAILED DESCRIPTION OF THE INVENTION

Figure 1:
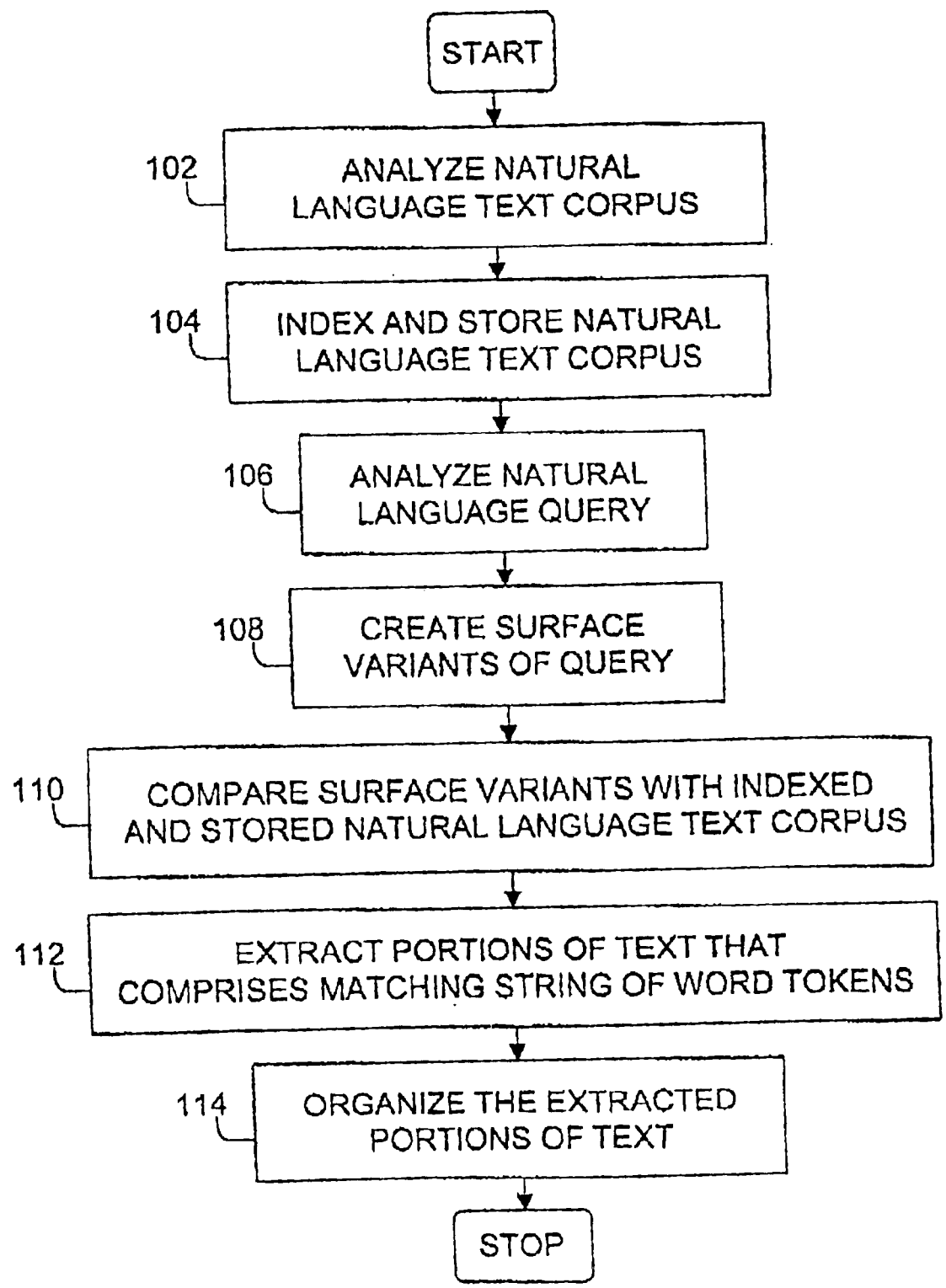
FIG. 1 is a flowchart of a method according to the invention.

FIG. 1 is a flowchart of a method according to the invention. In the method information is extracted from a natural language text corpus based on a natural language query. One example of a natural language text corpus is a subset of the information found in web servers on the Internet. To be able to use linguistic properties of the text corpus in order to match a natural language text query against the natural text corpus the natural language text corpus is analyzed, in step 102, with respect to surface structure of the word tokens and the surface syntactic roles of the constituents of the natural language text corpus. This is done in order to determine morpho-syntactic description for each word token, locate phrases, determine a phrase type for each of the phrases, and locate clauses. The morpho-syntactic description comprises a part-of-speech and an inflectional form, and the phrase types comprise subject noun phrase, object noun phrase, other noun phrases and prepositional phrases. A clause can be defined as a unit of information that roughly corresponds to a simple proposition, or fact. An example of an analyzed clause will be described below with reference to FIG. 2.

After the natural language text corpus has been analyzed it is indexed and stored in step 104 of FIG. 1. In this stop the spaces between each word token are numbered consecutively, whereby the location of each word token is uniquely defined by the numbers of the two spaces it is located between in the natural language text corpus. These two numbers form a unique word token location identifier. An alternative numbering scheme where each word token is consecutively number is also within the scope of tire invention. Since each word token is associated with a word type it is sufficient to store all of the word types of the natural language text corpus and then, for each of the stored word types, store the word token location identifier of each word token associated to this word type. Furthermore, the location of a phrase is uniquely defined by the number of the space preceding the first word token of the phrase and the number of the space succeeding the last word token of the phrase. These two numbers form a phrase location identifier. Thus, each phrase type is stored and the phrase location identifier of each of the phrases of this phrase type is stored. Note that, due to the way the phrase location identifier is defined, it is easy to find out whether a word token is of a certain type by determining whether the word token location identifier is within a phrase of this type. The location of a clause is uniquely defined by the number of the space preceding the first word token and the number of the space succeeding the last word token of the clause. These two numbers form a clause location identifier. Each of the clause location identifiers is stored. A sentence, a paragraph, and a document location identifier is formed in an equivalent manner and each of them are stored. After step 104*a* natural language query is analyzed, in step 106, in the same manner as the natural language text corpus was analyzed in step 102.

In step 108 of FIG. 1, a number of surface variants of the analyzed natural language query are created. The surface variants are created in such a manner that the lexical meaning of word tokens and the surface syntactic roles of constituents of the natural language query are preserved. In other words, each word token of the natural language query may be replaced with one or more word tokens that have the same lexical meaning and the word tokens may be rearranged as long as each constituent of a variant has an equivalent surface syntactic role as the corresponding one in the natural language query. A surface syntactic role is for example, head, modifier, subject noun phrase, object noun phrase etc. An example of a number of variants of a query will be described below with reference to FIGS. 3A-C.

When the surface variants have been created they and the natural language query are compared, in step 110 of FIG. 1, with stored natural language text corpus. In the comparison a word token in a surface variant is compared with the stored word types of the natural language text corpus and the word token location identifiers of the word tokens of the same word type as the word token in the surface variant are identified. The identified word token location identifiers are then used to determine the word tokens in the natural language text corpus that are included in a phrase of the same type as the word token in the surface variant. This is done by searching the phrase location identifiers associated with the phrase type the word token in the surface variant is included in and determining which of the identified word token location identifiers are included in one of these phrase location identifiers. This comparison is done for each word token in the variant and except for determining if the word token is included in the same phrase type it is determined if the word tokens are included in the same clause. This can be done easily by determining if the word token location identifiers are included in the same clause location identifier.

When all the surface variants and the natural language query has been compared in step 110, each portion of text comprising a string of word tokens that matches any one of the surface variants or the analyzed natural language query are extracted in step 112 of FIG. 1. A string of word tokens in the natural language text corpus matches a surface variant if it comprises the head words of phrases bearing the grammatical relations of subject, object, and lexical main verb in the surface variant in the same linear order as in the surface variant.

Finally, in step 114 of FIG. 1, the extracted portions of text are organized. This is done such that the portions of text are grouped according to degree of correspondence with the query with respect to lexical meaning of word tokens and surface syntactic roles of constituents. The degree of correspondence can be described such that a constituent in a portion of text having the same lemma as the equivalent constituent of the query is considered to have a higher degree of correspondence than a constituent in a portion of text being a synonym to the equivalent constituent of the query. Furthermore, the extracted portions of text are organized such that said portions of text are grouped according to sameness of grammatical subject, grammatical object, and lexical main verb.

In the following an example of an analyzed natural language query will be given with reference to FIG. 2. In the examples a number of abbreviations will be used which are explained in the table below:

| Abbreviation | Description |
| --- | --- |
| AT | Article |
| NN | Singular noun |
| VBD | Verb, past tense |
| nps | Subject noun phrase |
| npo | Object noun phrase |
| vp | Verb phrase |

Figures 2, 3A, 3B:
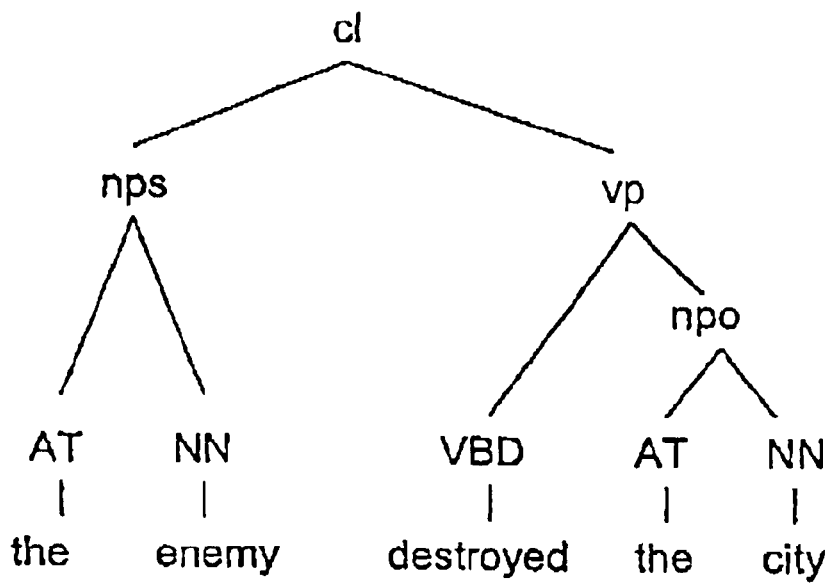
FIG. 2 is an illustration of an example of a natural language query and its constituents.
FIGS. 3A-C are illustrations of the natural language query of FIG. 2 and surface variants thereof.

In FIG. 2, an illustration of an example of a natural language query and its constituents and grammatical relations are shown. Note that this could just as well be a part of a natural language text corpus. The example query is "the enemy destroyed the city". The query is in this case a single clause that has the two main constituents "the enemy" which is a subject noun phrase nps and "destroyed the city" which is a verb phrase vp. The constituent "the enemy" in turn consists of the two constituents "the" which is an article AT and "enemy" which is a singular noun NN. The constituent "destroyed the city" Consists of the two constituents "destroyed" which is a verb in past tense VBD and "the city" which is a object noun phrase npo. The constituent "the city" in turn consists of the constituents "the", which is an article AT and "city" which is a singular noun NN.

Figures 3C, 4:
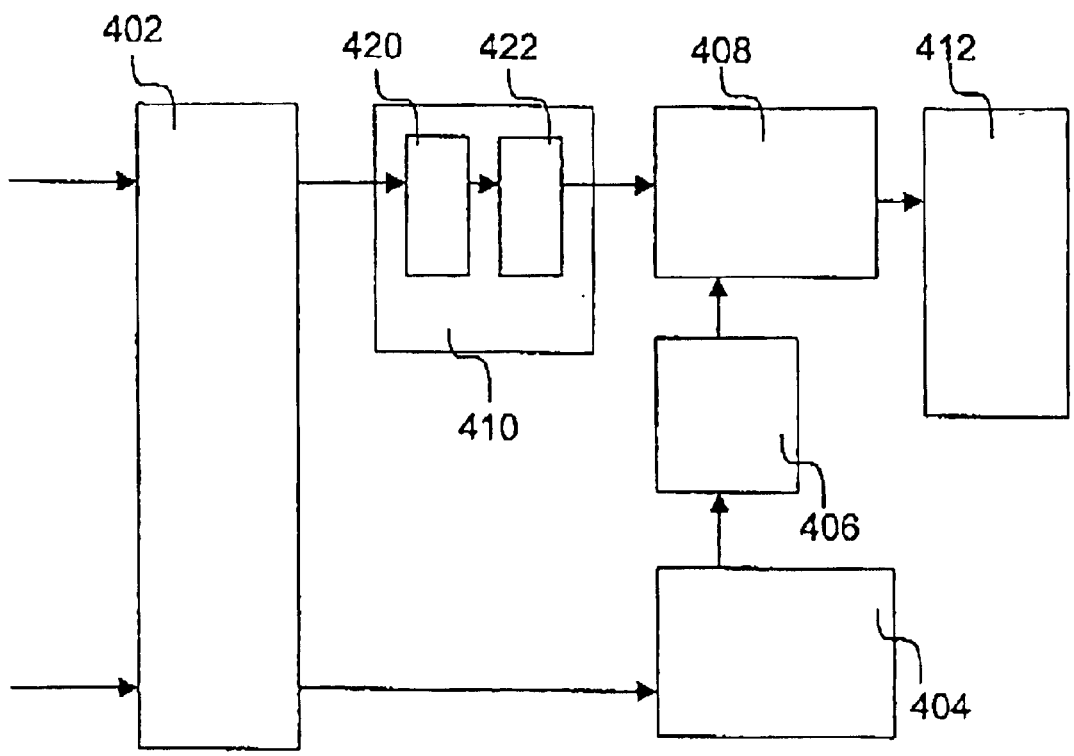
FIG. 4 is a schematic diagram of a system according to the invention.

In FIGS. 3A-C illustrations of the natural language query of FIG. 2 and two different surface variants thereof are given. The method for generating variants of a linguistic expression that constitutes a query is partly based on Zollig Harris' notion of transformation as defined in Harris, Z., Co-occurrence and transformation in linguistic structure, Language 33 (1957), pp 283–340, with the important difference that the method of the present invention makes use of the notion of initial clause, where Harris uses the traditional notion 'sentence'. For a description of 'initial clause', reference is made to the co-pending Swedish patent application 0002034-7, entitled "Method for segmentation of text", incorporated herein by reference and assigned to the assignee hereof.

Harris' 1957 paper defines a formal relation among sentences, by virtue of which one sentence structure may be called a transform of another sentence. This relation is based on comparing the individual co-occurrences of morphemes. By investigating the individual co-occurrences of morphemes in sentences, it is possible to characterize the distribution of classes of morphemes that are not easily defined in ordinary linguistic terms. Harris' transformations are defined based on two structures having the same set of individual co-occurrences of morphemes: "If two or more constructions which contain the same n classes (whatever else they may contain) occur with the same n-tuples of members of these classes in the same sentence environment, we say that the constructions are transforms of each other, and that each may be derived from any other of them by a particular transformation."

In the examples in FIGS. 3A-3C illustrating a natural language query and transformations to surface variants thereof, the following notation for morpheme and word classes is used: N (noun), V (verb), v (tense and verb auxiliary class), T (article), P (preposition), C (conjunction), and D (adverb).

For example, the constructions N v V N (a sentence) in FIG. 3A and N's Ving N (a noun phrase) in FIG. 3B are satisfied by the same triplets N, V, N (enemy, destroy, city) so that any choice of members which we find in the sentence, we also find in the noun phrase and vice verse: The enemy destroyed the city, the enemy's destroying the city. Where the class members are identical in the two or more constructions, Harris calls the transformation reversible, and writes it as $N_1$ v V $N_2$ ← → $N_1$'s Ving $N_2$ (and the set of triples for the first=the set for the second). The same subscript means the same member of the class: the second appearance of $N_1$ indicates the same morpheme as the first $N_1$. This example illustrates a first generic transformation that is used when creating surface variants of a natural language query. The transformation has the property that it maintains the lexical meaning of word tokens and surface syntactic roles of constituents of the natural language query. Thus, if we have the natural language query of FIG. 3A the surface variant of FIG. 3B can be created using the transformation:

$$N_1 \text{ v V } N_2 \rightarrow N_1\text{'s Ving } N_2.$$

In some cases, all the n-tuples which satisfy one construction (i.e. for which that construction actually occurs) also satisfy the other construction, but not vice versa. For example, every triple of $N_1$, V, and $N_2$ in the $N_1$ vV $N_2$ 'active' sentence in FIG. 3A can also be found, in reverse order, in the $N_2$ v be Ven by N1 'passive' sentence in FIG. 3C: The enemy destroyed the city, The city was destroyed by the enemy. This example illustrates a second generic transformation that is used when creating surface variants of a natural language query. The transformation also has the property that it maintains the lexical meaning of word tokens and surface syntactic roles of constituents of the natural language query. Thus, if we have the natural language query of FIG. 3A the surface variant of FIG. 3C can be created using the transformation:

$$N_1 \text{ v V } N_2 \rightarrow N_2 \text{ v be Ven by N1}$$

Note that some triplets only satisfy the second sequence and not the first: The wreck was seen by the seashore. Such cases Harris calls one-directed or nonreversible transformations: $N_1$ v V $N_2 \rightarrow N_2$ v be Ven by N1.

These two types of transformations for creating surface variants are only examples. Other similar transformations are obvious to the person skilled in the art and a re considered to be within the scope of the invention.

Turning now to FIG. 4, a schematic diagram of a system according to the invention is shown. The system comprises a text analysis unit 402, memory means 404, an indexer 406, an index 408, a query manager 410, a result manager 412, means 420 for creating surface variants, comparing means 422. The text analysis unit 402 is arranged to analyze a natural language text input, such as a natural language query or a natural language text corpus. The analysis is done in order to determine a morpho-syntactic description for each word token of the natural language input, locate phrases in the natural language input, determine a phrase type for each of the phrases, and locate clauses in the natural language input. The morpho-syntactic description comprises a part-of-speech and an inflectional form, and the phrase types comprises subject noun phrase, object noun phrase, other noun phrases and prepositional phrases.

In FIG. 4, the memory means 404, operatively connected to the text analysis unit 402, are arranged to store a natural language text corpus that has been analyzed by the text analysis unit 402. Furthermore, the indexer 406, operatively connected to the memory means 404, is arranged to index a natural language text corpus that is stored in the memory means 404. The indexing is based on a numbering scheme where the spaces between each word token are numbered consecutively. An alternative numbering scheme where each word token is consecutively number is also within the scope of the invention. Each word token is then defined by its word type and the numbers of the two spaces it is located between in the natural language text corpus. The two numbers of the spaces between which a word token is located form a word token location identifier for this word token. Furthermore, a phrase is uniquely defined by its phrase type and the number of the space preceding the first word token of the phrase and the number of the space succeeding the last word token of the phrase. The number of the space preceding the first word token of a phrase and the number of the space succeeding the last word token of the phrase form a phrase location identifier for this phrase. Similarly, a clause, a sentence, a paragraph and a document location identifier, respectively, is defined as the number of the space preceding the its first word token and the number of the space succeeding its last word token. The word types, word token location identifiers, phrase types, phrase location identifiers, clause location identifiers, paragraph location identifiers, sentence location identifiers and document location identifiers are stored in the index that is operatively connected to the indexer. The logical structure of the index is shown in the table below:

| Text Unit | Location Identifiers <i, j> |
| --- | --- |
| word type 1 | Word token location identifiers |
| word type 2 | Word token location identifiers |
| ... | |
| word type n | Word token location identifiers |
| nps | Phrase location identifiers |
| npo | Phrase location identifiers |
| npx | Phrase location identifiers |
| pp | Phrase location identifiers |
| cl | Clause location identifiers |
| s | Sentence location identifiers |
| p | Paragraph location identifiers |
| doc | Document location identifiers |

Where nps=subject noun phrase, npo=object noun phrase, npx=other noun phrase, pp=prepositional phrase, cl=clause, s=sentence, p=paragraph and doc=document. The logical structure of the index illustrated in the table is based on a hierarchy of text units that are related by inclusion. The purpose of the multi-layered structure of the index is that, in combination with the invention's shared location system for text units of different kinds, it supports a search technique that permits rapid access to those corpus text units that match the sot of complex constraints imposed by a given query and its surface variants.

In FIG. 4, the query manager 410 is operatively connected to the text analysis unit 402 and comprises means 420 for creating surface variants of a natural language query that has been analyzed in the text analysis unit 402. The created surface variants all have the property that the lexical meaning of its word tokens and the surface syntactic roles of its constituents are equivalent to the lexical meaning of the word tokens of the natural language query and the surface syntactic roles of the constituents of the natural language query, respectively. In other words, when a surface variant is created, each word token of the natural language query may be replaced with one or more word tokens that have the same lexical meaning and the word tokens may be rearranged as long as each constituent of a variant has an equivalent surface syntactic role as the corresponding one in the natural language query. A surface syntactic role is for example, head, modifier, subject noun phrase, object noun phrase etc. Furthermore, the query manager comprises comparing means 422 for comparing the surface variants created in the surface variant unit and the natural language query with analyzed natural language text corpus stored in the index. The comparing means 422 use the structure of the index in order to do the comparison. By determining the word type of a word token in a surface variant the word token location identifiers index associated with the determined word type can be identified in the index. Furthermore, since the phrase type the word token is in has been determined in the text analysis unit, it can be determined which of the identified word token location identifiers are included in a phrase of the same type as the word token in the surface variant. This is done by searching the phrase location identifiers associated with the phrase type the word token in the surface variant is included in and determining which of the identified word token location identifiers are included in one of these phrase location identifiers. This comparison is done for each word token in the variant and except for determining if the word token is included in the same phrase type, the index is used to determine if the word tokens are included in the same clause.

Finally, in FIG. 4, the system comprises a result manager 412, operatively connected to the index 412, for extracting each portion of text comprising a string of word tokens that matches any one of the surface variants or the natural language query. A string of word tokens in the natural language text corpus matches a surface variant if it comprises the main words of phrases bearing the grammatical relations of subject, object, and lexical main verb in the surface variant in the same linear order as in the surface variant. The portion of text to be extracted can be chosen as the string of word tokens itself or the clause, the sentence, the paragraph or the document that the string of word tokens are included in. The extraction means use the index to find the proper clause, sentence, paragraph and document by consulting the respective location identifiers in the index.

What is claimed is:

1. A method of storing a natural language text corpus in a database, comprising the steps of:

identifying word tokens of said natural language text corpus;

determining locations in the natural language text of the identified word tokens;

determining word types associated with the identified word tokens;

storing the determined word types in said database, wherein the number of stored word types is less than the number of identified word tokens;

storing word token location identifiers identifying the determined locations in the natural language text corpus of the identified word tokens; and linking the stored word token location identifiers to the stored word types, such that, for a given identified word token, the stored word token location identifier identifying the location of the identified word token is logically linked to the stored word type associated with the identified word token.

2. The method according to claim 1, further comprising the steps of:

determining morpho-syntactic descriptions for the identified word tokens;

storing the morpho-syntactic descriptions for the identified word tokens; and linking the stored morpho-syntactic descriptions to the stored word token location identifiers, such that, for a given identified word token, the stored morpho-syntactic description for the identified word token is logically linked to the stored word token location identifier identifying the location of the identified word token.

3. The method according to claim 2, wherein the morpho-syntactic description of a word token comprises a part-of-speech and an inflectional form of the word token.

4. The method according to claim 1, further comprising the steps of:

identifying phrases of said natural language text corpus;

determining word tokens comprised in the identified phrases; and storing phrase location identifiers identifying the stored word token location identifiers of the word tokens comprised in the identified phrases, such that, for a given identified phrase, the stored phrase location identifier of the identified phrase identifies the stored word token location identifiers identifying the location of the word tokens comprised in the identified phrase.

5. The method according to claim 4, further comprising the steps of:

determining phrase types of the identified phrases;

storing the determined phrase types; and linking the stored phrase types to the stored phrase location identifiers, such that, for a given identified phrase, the phrase type for the identified phrase is logically linked to the stored phrase location identifier identifying the stored word token location identifiers identifying the location of the word tokens comprised in the identified phrase.

6. A system for storing a natural language text corpus, comprising:

a text analysis unit for identifying word tokens of said natural language text corpus, determining locations in the natural language text of the identified word tokens, and determining word types associated with the identified word tokens;

a database for storing the determined word types, wherein the number of stored word; types is less than the number of identified word tokens, storing word token location identifiers identifying the location in the natural language text corpus of a respective identified word token, and linking the stored word token location identifiers to the stored word types, such that, for a given identified word token, the stored word token location identifier identifying the location of the identified word token is logically linked to the stored word type which is associated with the identified word token.

7. The system according to claim 6, wherein the text analysis unit is further adapted to determine morpho-syntactic descriptions for the identified word tokens, and the database further stores the morpho-syntactic descriptions for the identified word tokens, and links the morpho-syntactic descriptions to the stored word type location identifiers, such that, for a given identified word token, the morpho-syntactic description for the identified word token is logically linked to the stored word token location identifier identifying the location of the identified word token.

8. The system according to claim 7, wherein the morpho-syntactic description for the word token comprises a part-of-speech and an inflectional form of the word token.

* * * * *

UNITED STATES PATENT AND TRADEMARK OFFICE
CERTIFICATE OF CORRECTION

PATENT NO. : 6,842,730 B1
DATED : January 11, 2005
INVENTOR(S) : Eva Ingegerd Ejerhed et al.

It is certified that error appears in the above-identified patent and that said Letters Patent is hereby corrected as shown below:

Title page,
Insert Item -- [30] Foreign Application Priority Data
June 22, 2000 (SE) ......... 0002368-9 --.

Signed and Sealed this

Twelfth Day of July, 2005

JON W. DUDAS
*Director of the United States Patent and Trademark Office*